United States Patent [19]

Holzinger et al.

[11] Patent Number: 4,636,667
[45] Date of Patent: Jan. 13, 1987

[54] EXCITATION ARRANGEMENT FOR A LONG STATOR DRIVE

[75] Inventors: Gerhard Holzinger, Munich; Jürgen Meins, Baldham; Luitpold Miller, Ottobrunn, all of Fed. Rep. of Germany

[73] Assignee: Thyssen Industrie AG, Fed. Rep. of Germany

[21] Appl. No.: 697,048

[22] Filed: Jan. 31, 1985

[30] Foreign Application Priority Data

Mar. 20, 1984 [DE] Fed. Rep. of Germany ....... 3410119

[51] Int. Cl.$^4$ ........................................... H02K 41/00
[52] U.S. Cl. ...................................... 310/13; 318/135; 104/291; 104/292; 104/294
[58] Field of Search ..................................... 310/12–14; 318/135; 104/290, 291, 292, 294

[56] References Cited

U.S. PATENT DOCUMENTS 3,602,745  8/1971  Davis ..................................... 310/13
4,013,906  3/1977  Eastham ................................ 310/13
4,232,237 11/1980  Popov ................................... 310/13
4,542,312  9/1985  Kawamura ............................ 310/13

Primary Examiner—Donovan F. Duggan
Attorney, Agent, or Firm—Hill, Van Santen, Steadman & Simpson

[57] ABSTRACT

An excitation arrangement for a long stator drive for rapid transit systems has combined generation of propulsive and portative forces. The arrangement comprises at least one heteropolar magnet which has a plurality of channels extending at right angles relative to the direction of the long stator, the channels being open at their pole plane lying opposite the long stator and magnetic coils are located in the channel. The channels have a rectangular cross section extending up to the pole plane and the conductors of the magnetic coils are wound in tight contact with one another and with the channel walls on the side of the poles. The magnet comprises at least one recess extending parallel to the channels beneath the pole plane.

10 Claims, 3 Drawing Figures

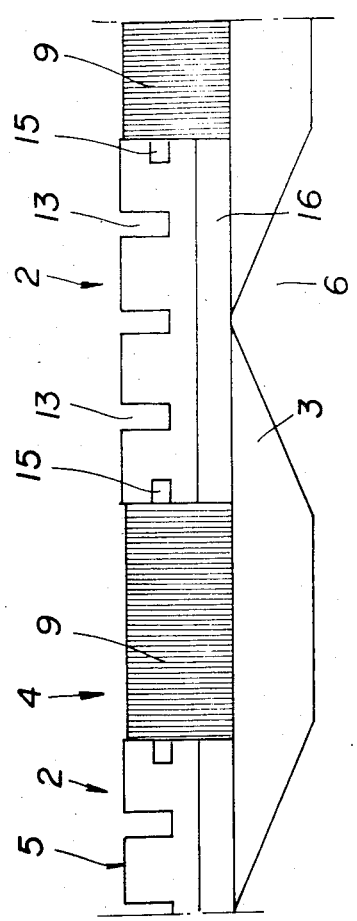
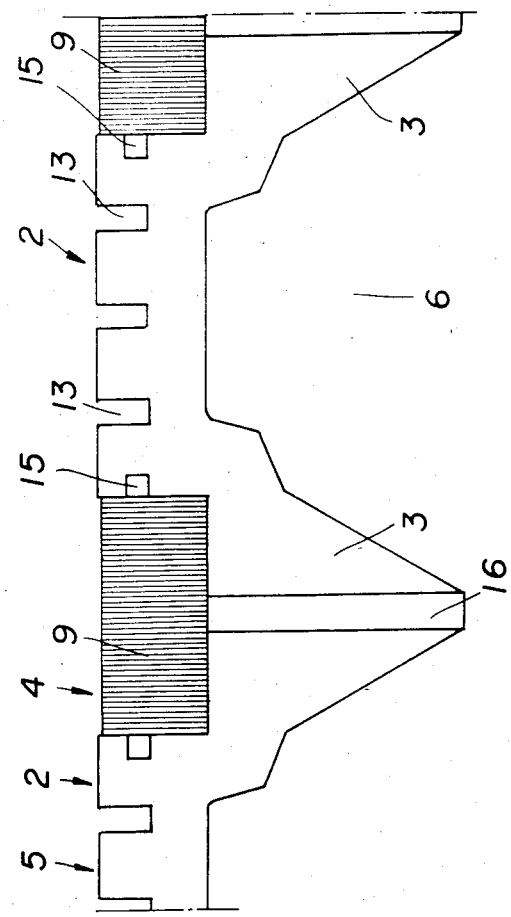

EXCITATION ARRANGEMENT FOR A LONG STATOR DRIVE

BACKGROUND OF THE INVENTION

1. Field of the Invention

The present invention relates to an excitation arrangement for a long stator drive, particularly for a synchronous long stator drive for rapid transit systems having combined generation of propulsion and portative forces, comprising at least one heteropolar magnet which has a plurality of grooves extending at right angles relative to the direction of the long stator, the grooves being open at their pole plane lying opposite the long stator with magnetic coils assigned to the conductors in the grooves.

2. Description of the Prior Art

Given a known excitation arrangement as disclosed in the German published application No. 30 41 940, fully incorporated herein by this reference, for rapid transit magnetic levitation vehicles, each magnet is composed of a through magnet spine from which pole pieces extend which carry broadened pole shoes at their ends. The prefabricated magnetic coils are disposed in the grooves or channels remaining between the pole pieces, the magnetic coils being wound onto separate winding forms and being respectively incorporated into the magnets are preformed coils. Since the channel cross section is not entirely filled, an unfavorable filling factor derives. Overall, the arrangement leads to relatively high magnet weights by way of which the dynamic properties of the levitation railroad are negatively affected.

SUMMARY OF THE INVENTION

The object of the present invention is to reduce the magnet weight that should be considered as an unsprung mass in order to improve the dynamic properties. The properties of the magnets should thereby not be deteriorated.

The above object is achieved, according to the present invention, in that the channels comprise a rectangular cross section extending up to the pole plane, in that the conductors of the magnetic coils are placed in tight contact with one another as well as to the channel walls, and in that the magnet comprises at least one recess extending parallel to the channels below the pole plane of the magnet.

The above arrangement enables the available channel cross section to be completely filled out with the magnetic coil material. This can lead, in fact, to a somewhat increased overall height of the magnet, but the magnet weight can be reduced in that one or more recesses extending parallel to the channels are disposed beneath the pole plane. This also has the advantage that the mean magnetic circuit length of the magnetic circuit beneath the pole plane is shortened and, as a result thereof, the magnetic voltage drop in the ferromagnetic circuit is reduced.

According to a preferred embodiment of the invention, the conductors of the magnetic coils are composed of tapes whose tape width corresponds to the depth of the channel. These tapes can be directly wound about the pole or, respectively pole pieces formed between neighboring channels. The filling factor is thereby increased and the coil height is increased in comparison to the known magnets equipped with pole shoes. Furthermore, due to the direct contact of the magnetic coil to the pole piece, which contact is only electrically insulated, the thermal contact resistance between the magnetic coil and pole piece is reduced, so that a significant portion of the stray power arising in the magnetic coil can be dissipated via the magnetic iron core. Since the maximally permissible magnetic coil temperature is also a design criterion for the allowable current density, the current density can be increased given improved heat dissipation.

The weight-saving recesses are advantageously located beneath the poles of the magnet, whereby the recesses can also extend into the pole piece in individual cases.

Due to the heteropolar arrangement, the end poles of a magnet are designed as half poles. Dependent on a selected pole detuning, the space between neighboring ends of two magnets correspond roughly to a stator pole division. In order to avoid overlaps of the coil space at the end poles of neighboring magnets, it is beneficial when the conductors of the magnetic coils at the end poles of each magnet are wound about the magnet spine. In addition, a weight reduction of the magnetic coil at the end pole occurs given a height-of-coil/-width-of-coil ratio of less than 1 by way of shortening the mean winding length.

For contact-free out-coupling of energy in rapid transit magnet levitation vehicles, linear generator windings are inserted into assigned channels at that side of the pole shoes forming the pole plane. A modulation of the flux distribution occurs in the air gap between pole shoe and fluted long stator given relative movements. As a result thereof, a voltage which is utilized for partially or completely covering the power consumption of the vehicle via suitable rectifier circuits is induced in the linear generator winding. These linear generator winding paths can be advantageously, at least partially, located in grooves disposed at the channel walls of a pole side.

When such excitation arrangements also comprise permanent magnets for generating stationary magnetic forces, then the excitation required for generating stabilizing forces is exerted by way of additional magnetic coils. According to a preferred embodiment of the invention, the permanent magnets should be disposed in the magnet spine beneath the magnetic coils or in the poles adjacent to the magnetic coils so that a fashioning of the magnetic pole can occur in the described way.

Given known excitation arrangements, the magnetic pole division is diminished in comparison to the long stator division in order to minimize fluctuations in portative power of the overall magnet due to fluctuations of the magnetic conductance between the pole shoe and the fluted reaction rail by an offset of the magnetic poles. This deviation, however, leads to a deviation of the pole angle between the drive and the magnet and, therefore, to a loss of thrust power.

The magnetic pole division, however, can also be increased in comparison to the stator pole division. Given the same deviations of the pole angle between the drive and the magnet, an increase of the magnetic pole division has the advantage that the pole gap is elongated and, therefore, the channel height can be selected lower with a given channel cross section. The consequence thereof is a lower magnet height given an individual elongated magnet. Further, the pole face scatter also decreases. Due to the lower magnetic load of the ferromagnetic circuit, the pole piece area can therefore also be selected lower. This also leads to a reduction in the weight of the magnet iron.

Metallic plates are advantageously disposed between the magnetic poles and the magnetic coils for the dissipation of the losses arising in the magnet coils.

For the purpose of good thermal coupling, the magnetic plates are connected to the magnetic coil electrically conductive and the electrical insulation is disposed between the magnetic plates and the magnetic pole.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a fragmentary showing of another embodiment of the invention; and

FIG. 3 is a fragmentary view illustrating yet another embodiment of the invention.

DESCRIPTION OF THE PREFERRED EMBODIMENTS

Figure 1:
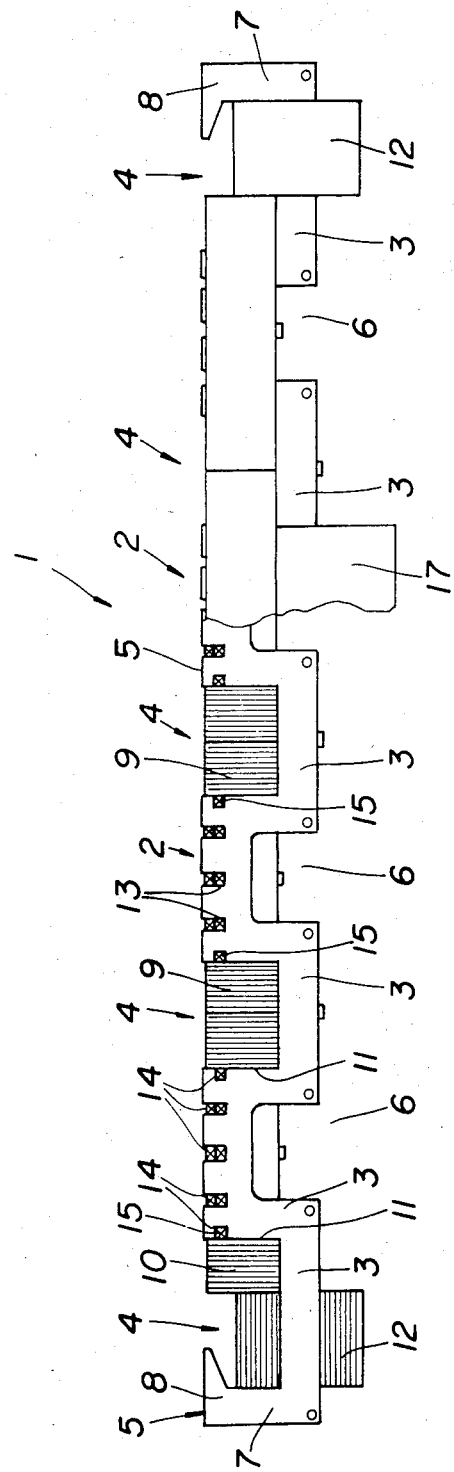
FIG. 1 is a schematic illustration, shown partially in section, of a heteropolar magnet for an excitation arrangement of a synchronous long stator drive.

Referring to FIG. 1, a magnet 1 has a meander-like cross section comprising a plurality of poles 2 disposed at a distance from one another and which extend in the longitudinal direction of a fluted long stator (not shown). The poles 2 are respectively united to one another by way of a magnet spine 2. Located above the sections of the magnet spine 3 are channels 4 which extend transversely of the magnet 1, the channels 4 having a rectangular cross section and respectively extending up to a pole plane 5 formed by the upper surface of the magnet 1. Recesses 6 which likewise extend over the entire width of the magnet 1 are located beneath the poles 2. The magnet 1 is limited in the longitudinal direction by end poles having pole pieces 7 and emplaced, lengthened pole shoes 8. The pole shoes 8 extend over a portion of the neighboring channel 4.

Respective magnetic coils 9 are located in the channels 4, the magnetic coils being composed of tapes 10 whose tape width roughly corresponds to the depth of the channel 4. The tapes 10 are wound electrically insulated directly about the poles 2, in particular with a tight contact to one another as well as to the channel walls 11 at the sides of the poles. As shown, the channels 4 are completely filled with the magnetic coils 9.

In the region of the channel 4 proximate to the end poles, magnetic coils 12 are likewise wound of tapes about their assigned section of the magnet spine 3.

Smaller channels or grooves 13 for receiving linear generator windings 14 are located on the upper side of the poles 2 which forms the pole plane 5. Further linear generator windings are accommodated in grooves 15 in the pole walls extending inwardly from the respective surfaces 11.

FIGS. 2 and 3 additionally illustrate the provision of permanent magnets 16 which, given the embodiment of FIG. 2, are located beneath the poles 2 and, given the embodiment of FIG. 3, are located beneath the channels 4. The permanent magnets are excited by the magnetic coils 9.

What is not shown is that the detuning of the magnetic pole division required relative to the long stator for the suppression of the fluting influence is achieved by an enlargement of the division of the pole 2 of the magnet 1.

The magnet weight can be substantially reduced with the illustrated excitation arrangement because the pole gap is lengthened due to the enlargement of the magnetic pole division and the channel width can be selected smaller in the case of a given channel cross section. Therewith, the pole face scatter also decreases, so that the iron cross section can be reduced due to the lower magnetic load of the ferromagnetic circuit. Since the channel cross section is completely filled with coil material, the structural height of the magnet 1 can be reduced overall. An additional reduction of the weight derives from the recesses 6 beneath the poles 2 with the advantage that the mean magnetic circuit length of the magnetic circuit under the pole plane 5 is shortened and the magnetic voltage drop is diminished. The thermal contact resistance between the magnetic coil and the poles is likewise reduced due to the tight contact between the magnetic coil and the pole wall, so that the stray power can be increasingly dissipated via the magnet iron. This enables an increase in the current density given the same or reduced magnet weight.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of my contribution to the art.

We claim:

1. An excitation arrangement for a rapid transit long stator drive which provides both propulsive and portative forces, comprising:

an elongate magnet member including a first surface constituting a pole plane, a second surface opposite said first surface, a plurality of spaced apart first channels extending from said first surface into and transversely of the length of said magnet member to define poles therebetween, and at least one second channel extending parallel to and between adjacent ones of said first channels and into said magnet member from said second surface thereby reducing the weight of said magnet member; and a plurality of magnetic coils, each of said coils electrically insulated and wound in tight contact with one another and with the walls of the first channels with the windings extending transversely through and completely filling the first channels.

2. The excitation arrangement of claim 1, wherein:

each of said coils comprises a tape having a width corresponding to the depth of a first channel.

3. The excitation arrangement of claim 1, wherein:

each of said coils comprises a tape having a width corresponding to the depth of a first channel and is wound about a respective pole so that adjacent coils fill a respective first channel.

4. The excitation arrangement of claim 1, wherein:

a plurality of said second channels are provided and each is located beneath a respective pole.

5. The excitation arrangement of claim 4, wherein:

said first and second recesses define a magnet spine connecting the poles;

two of said poles constitute end poles connected to adjacent poles by respective magnetic spines; and further comprising a pair of additional magnetic windings each wound about a respective magnetic spine adjacent a respective end pole.

6. The excitation arrangement of claim 1, and further comprising:
   a plurality of third channels in each of the poles; and
   a plurality of linear generator windings in said third channels.

7. The excitation arrangement of claim 4, and further comprising:
   a plurality of permanent magnets.

8. The excitation arrangement of claim 1, and further comprising:
   metallic plates between said poles and said magnetic coils.

9. The excitation arrangement of claim 8, and further comprising:
   electrical insulators between said metallic plates and said poles, said magnetic coils electrically connected to said metallic plates.

10. The excitation arrangement of claim 1, for use with a stator having a predetermined pole spacing, wherein:
    the pole spacing of said member is greater than the predetermined pole spacing of the stator to suppress the fluting influence.

* * * * *